UNITED STATES PATENT OFFICE.

ROBERT IRVING DOWD, OF BELOIT, WISCONSIN.

COMPOSITION FOR MAKING GRINDSTONES.

1,045,531.

Specification of Letters Patent.

Patented Nov. 26, 1912.

No Drawing.

Application filed May 13, 1912. Serial No. 697,020.

*To all whom it may concern:*

Be it known that I, ROBERT I. DOWD, a citizen of the United States, residing at Beloit, in the county of Rock and State of Wisconsin, have invented certain new and useful Improvements in Composition for Making Grindstones; and I do hereby declare the following to be a full, clear, and exact description of the invention, such as will enable others skilled in the art to which it appertains to make and use the same.

My invention relates to an improvement in composition for making grindstones.

All natural or quarried grindstone stones, and all artificial ones that I am aware of, when wet or dry, throw off a dust which is exceedingly injurious to the operator's health, and which has necessitated the employment of expensive means for carrying off the dust.

The principal object of this invention is to provide a composition which when molded and properly set, can be used either wet or dry without throwing off any appreciable dust, and which, by varying the proportion of sand and quartz can be made of varying degrees of hardness for metals of varying degrees of hardness or temper.

The composition which I have found most advantageous consists of two (2) parts Portland cement; two (2) parts ground quartz and one (1) part washed sand. After the quartz has been thoroughly ground, the cement, quartz and sand, in substantially the proportion stated, are deposited in a mixer and thoroughly mixed. After the materials have been mixed, or during the mixing process, just enough water to moisten the mass is added, and the mixture is then packed in the mold or form of the desired shape and size, and subjected to pressure in order to solidify the mass, and is retained in the mold or form for about thirty-six hours. After it has been removed from the form it is exposed to the atmosphere, and turned at intervals of a day or two, so as to equally expose all parts of the stone, for a period of about thirty days, after which time the stone is ready for use.

I have found by actual use, that artificial stones so made will cut faster and freer than any quarried stone, are more regular in texture and will not glaze or burn when grinding high tempered steel. Again all quarried grind stones require frequent dressing to keep them in shape, but stones made from my composition are so free cutting that they keep sharp at all times without any dressing whatever.

By changing the proportion of the ingredients the stones may be specially adapted for a particular kind of work. Thus by adding cement and sand or reducing the quantity of quartz, the stone will be softer, and by increasing the proportion of quartz the stones will be harder. If the pieces to be ground are high tempered, an increase in the proportion of sand and a decrease in the quantity of quartz makes the stone softer, hence better adapted for the high tempered metal, whereas an increase in the proportion of quartz makes the stone harder and better adapted for low tempered metals.

Having fully described my invention what I claim as new and desire to secure by Letters-Patent, is:—

The herein described composition of matter consisting of cement, ground quartz and washed sand, substantially in the proportions specified, thoroughly mixed and moistened with water, and molded into grindstone shape.

In testimony whereof, I have signed this specification in the presence of two subscribing witnesses.

ROBERT IRVING DOWD.

Witnesses:
NELLIE E. JONES,
DON. VAN WART.